Dec. 24, 1963  W. M. ADAMS  3,115,194
NUCLEAR REACTOR APPARATUS FOR EARTH PENETRATION
Filed Feb. 14, 1962  2 Sheets-Sheet 1
Fig. 1.
Fig. 2.
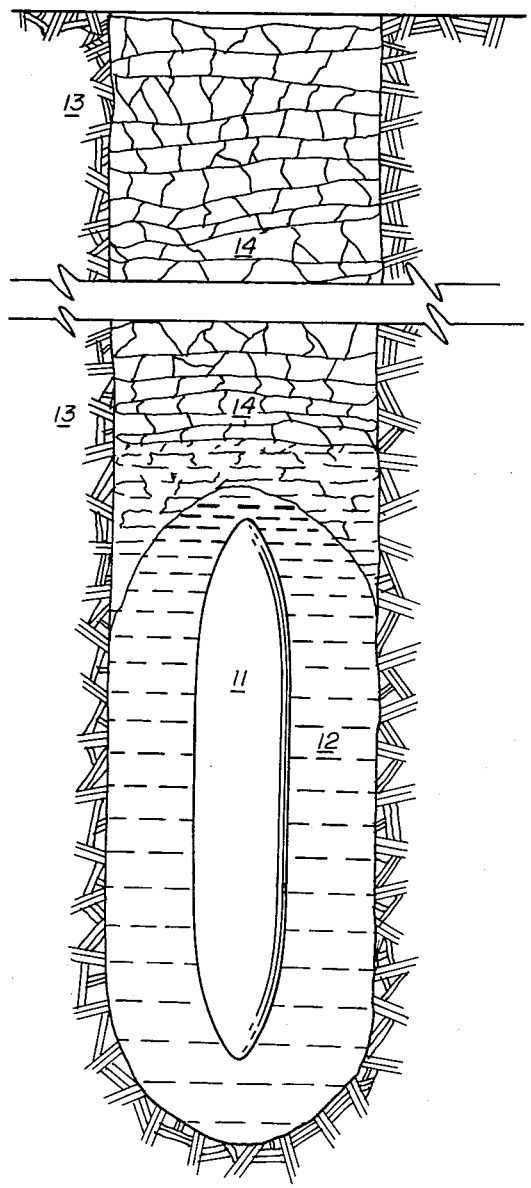
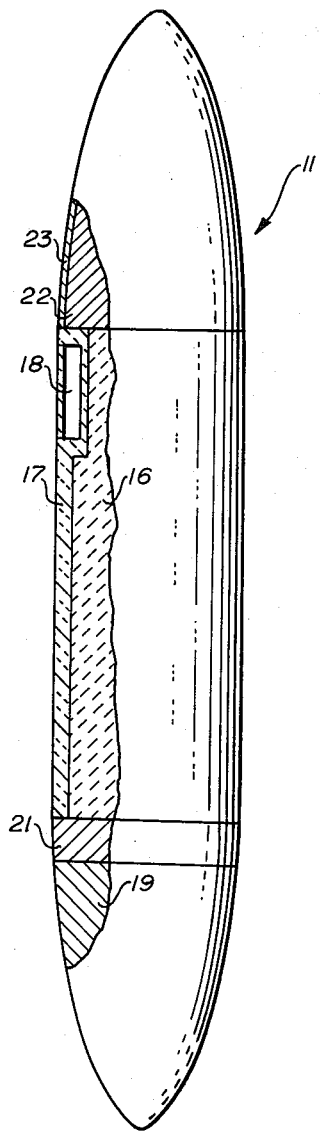
INVENTOR.
WILLIAM M. ADAMS
BY
ATTORNEY

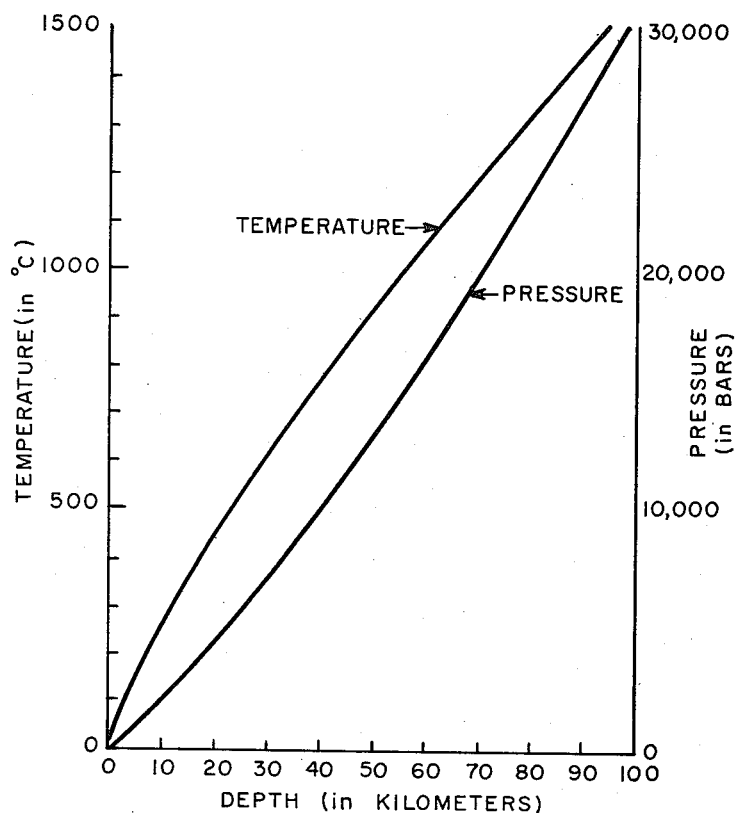

United States Patent Office 3,115,194
Patented Dec. 24, 1963

3,115,194
NUCLEAR REACTOR APPARATUS FOR EARTH PENETRATION
William M. Adams, Livermore, Calif., assignor to the United States of America as represented by the United States Atomic Energy Commission
Filed Feb. 14, 1962, Ser. No. 173,313
4 Claims. (Cl. 175—11)

This invention relates to methods and apparatus for geological exploration and, more particularly, to a method and apparatus for penetrating deep into the earth's crust.

Most of the available data concerning the composition and properties of the earth's crust has been obtained by two methods: conventional drilling techniques and seismic exploration. The limiting depth for conventional drilling operations is about 25,000 feet. The technical problems encountered at greater depths are virtually insurmountable. Since the earth's crust is about 20 miles thick, it is apparent that conventional drilling methods are only capable of obtaining data from the upper crustal region. Seismic methods, on the other hand, are capable of providing limited information from much greater depths. However, much information of great interest, e.g., chemical composition of deep strata, cannot be obtained by seismic investigation.

The present invention provides a method and apparatus for obtaining data and samples of the earth's crust from depths up to about 100,000 feet. Briefly, the method of the invention comprises placing an unshielded instrument-carrying nuclear reactor in a shallow hole on the surface of the earth's crust directly above the formation to be investigated. The heat output of the reactor melts the underlying rock, and the reactor sinks through the resulting magma, because the average density of the reactor is greater than the density of the magma. As the reactor sinks, the instruments continuously record data, which is either stored or telemetered to the surface.

The apparatus of the invention comprises a nuclear reactor in combination with an instrument compartment and a novel ballast arrangement, whereby the reactor can be recovered after reaching a predetermined depth. For reasons which will be explained later, it is desirable to make the reactor package as slim as possible. Therefore, for purposes of identification and brevity, the combined reactor-instrument-ballast package will hereinafter be referred to as a "Needle" reactor.

Accordingly, the main object of the invention is to provide a method for penetrating deep into the earth's crust.

Another object of the invention is to provide apparatus for obtaining data and samples from deep within the earth's crust.

The invention will be described with reference to the accompanying drawing, of which;
FIGURE 1 is a schematic illustration of a Needle reactor melting its way through the earth's crust,
FIGURE 2 is a detailed schematic view of the Needle reactor shown in FIGURE 1, and
FIGURE 3 is a graphical plot of temperature and pressure within the earth's crust as functions of depth.

Referring now to FIGURE 1, there is shown a Needle reactor 11 which is surrounded by a "bubble" of magma (molten rock) 12. The unmelted rock formation adjacent the magma bubble is designated 13, and the cooler, solidifying magma above the molten bubble is numbered 14.

Referring to FIGURE 2, there is shown a Needle reactor 11 comprising a generally cylindrical core 16 which is surrounded by a coaxial sleeve of thermal insulation 17. A portion of sleeve 17 is recessed to form an instrument and sampling compartment 18. A high-density ballast section 19 is coupled to one end of the reactor by means of a release mechanism 21. A low-density float section 22 is fixed to the opposite end of the reactor, and is encased in a self-supporting containment shell 23.

In the operation of the invention, the Needle reactor is placed vertically so that ballast section 19 is in contact with the earth's crust. The heat flux from core 16 is constrained to flow axially, since insulating sleeve 17 minimizes heat flow in the radial direction. Thus, the heat output of the core reaches the environment by radiation and conduction through end sections 19 and 22. Ultimately, the rock in contact with end section 19 is heated to its melting point, and the reactor sinks through the resulting magma. As the reactor sinks through the rock, the magma column above the reactor cools and solidifies, thereby encasing the reactor in a liquid magma "bubble." At a predetermined depth, release mechanism 21 uncouples ballast section 19 from the body of the reactor. The presence of the low-density float section 22 causes the overall density of the reactor to be less than that of the surrounding magma. As a result, the reactor remelts the solidified magma column above it, floats upward through the magma, and ultimately returns to the earth's surface. Containment shell 23 serves to contain the material of float 22, in the event the float is melted by the high-temperature magma. The function of the containment shell is discussed below in greater detail. Data and samples are then recovered from the compartment 18.

The average melting temperature of rock is about 1100° C. Therefore, the Needle reactor must operate at a temperature of at least 1100° C. to effectively melt its way through the earth's crust. A suitable nuclear core for the Needle reactor comprises a sintered mixture of uranium dioxide ($UO_2$) and beryllium oxide (BeO). Such a core is capable of sustained operation at temperatures well in excess of 1100° C. In order to avoid excess temperatures in the central region of the core, the $UO_2$ concentration is varied axially so as to provide maximum reactivity in the end portions of the core, and minimum reactivity in the central core region. This method of varying fuel loading to achieve localized reactivity maxima is known as "shading" the fuel. The design and fabrication of shaded reactor cores of this type are well known to those skilled in the high-temperature reactor art. Information concerning mixtures of uranium dioxide and various refractory oxides, and their use in nuclear reactor fuels, is contained in the book "Uranium Dioxide: Properties and Nuclear Applications," pages 22–23, 152–172, 272–304, and 431–666, published by the U.S. Atomic Energy Commission (1961). Further information regarding the fabrication of $UO_2$-BeO sintered fuel elements is available in reports published by Battelle Memorial Institute, Columbus, Ohio, e.g., reports BMI–1189, –1377, –1403, –1409, and –1448. An alternative core for a Needle reactor comprises a molten plutonium fuel contained within a tantalum vessel. Fluid cores of this type are discussed by J. A. Lane et al., in "Fluid Fuel Reactors," page 939, Addison-Wesley Publishing Co., 1958. Various other types of nuclear cores suitable for use in a Needle reactor will be apparent to those skilled in the nuclear reactor art.

Assuming a generally cylindrical rock core, the volume of rock which must be melted to reach a given depth is proportional to the square of the core's diameter. Therefore, to minimize the weight of rock which must be melted, it is desirable to make the Needle reactor as thin as practicable. A typical Needle reactor using a $UO_2$-BeO core is 2 to 3 feet in diameter, and of any suitable length depending upon the ultimate depth to be reached. The following calculation illustrates the determination of the ultimate depth obtainable with a typical Needle reactor design.

Assuming an initial fuel load of M kilograms of $U^{235}$ (in the form of $UO_2$), of which P% fissions with a potential energy release of $7.12 \times 10^{20}$ ergs per kilogram, then the total energy release is $7.12 \times 10^{20} \times P \times M$ ergs. This corresponds to $1.7 \times 10^{13} \times P \times M$ calories. For rock having an average heat capacity of 0.3 calorie per gram, and an average heat of fusion of 200 calories per gram, the energy released during fission of the above fuel loading would melt $3.4 \times 10^{10} \times P \times M$ grams of rock. If this weight of rock is melted to form a cylindrical core D centimeters in diameter, L centimeters deep, in rock of density $\rho$, then the depth L is given by the following relation:

$$L = \frac{3.4 \times 10^{20} \times P \times M}{\pi \rho (D/2)^2}$$

Using P=2%, M=100 kg., $\rho$=3 gm./cm.$^3$, and D=100 cm. then $L=2.88 \times 10^6$ cm. This corresponds to 94,000 feet, or about 18 miles. Since the earth's crust is about 20 miles thick, the above calculation shows that a Needle reactor constructed and operated in accordance with the invention is capable of completely penetrating the earth's crust. Even greater depths may be achieved by increasing the initial fuel loading of the reactor core. The ultimate depth obtainable is limited by the ability of the reactor's structural materials to withstand the extreme high temperatures existing at great depths. FIGURE 3 is a graphical plot of temperature and pressure within the earth's crust as functions of depth.

The velocity at which the Needle reactor will fall through the magma can be approximated by the terminal velocity of a cylinder falling along the axis of a vertical tube in a viscous medium. This velocity, in turn, can be approximated by the terminal velocity of a sphere falling in an unconfined viscous fluid, as given by the following relation:

$$U = \frac{2}{9} \frac{\rho' - \rho}{\mu} g a^2$$

where: $\rho$=density of fluid; $\rho'$=mean density of sphere; g=acceleration of gravity; a=radius of sphere; $\mu = a \cdot v$, where v=viscosity of fluid. This equation for the terminal velocity is given by H. Lamb in "Hydrodynamics," p. 599, Eq. 17, Dover Pub. (1945). Using $g=10^3$ cm./sec.$^2$; a=50 cm.; $\rho'-\rho$=4.5; and $\mu=10^7$; the velocity U is calculated to be 0.25 cm./sec. This corresponds to 0.01 ft./sec. The magma density ($\rho$) has been taken as 2.8 gm./cc., and the overall Needle reactor density with ballast ($\rho'$) has been taken as 7.3 gm./cc. in the calculation. The calculated rate of fall is only approximate, since the viscosity of magma is not known with certainty. A magma viscosity of $2 \times 10^5$ poises has been assumed in the foregoing calculation, since this value is consistent with the observed flow velocities of freshly-vented lava. At the calculated rate of descent, it would take a Needle reactor approximately three months to reach a depth of 100,000 feet.

As mentioned previously, the heat output of the reactor core is constrained to flow axially out the end sections 19 and 22 because of the presence of insulation sleeve 17. Therefore, for the most efficient utilization of the thermal output, it is essential that the end sections be constructed of materials having a high thermal conductivity. In addition, these end sections must be fabricated of materials having a melting point greater than that of the ambient magma temperature, i.e., about 1100° C. Tungsten is a preferred material for ballast section 19 because of its high density, high melting point and thermal conductivity, and relative non-corrodibility. The selection of a proper material for float section 22 is more difficult, because, in addition to high melting point and thermal conductivity, the float section must be constructed of a low density material. Beryllium is the preferred material for float section 22 because the density of beryllium (1.8 gm./cc.) is considerably less than the average density of magma (2.8 gm./cc.). This magma density corresponds to the generally-accepted density value for the continental crust of the earth (see, e.g., Poldervaart, "Crust of the Earth," p. 99, Geological Society of America, 1955). Because of the relatively low melting point of beryllium (1300° C.), it is necessary to encase the float section in a self-supporting containment shell 23. The shell serves as a rigid vessel to contain the liquid beryllium in the event the float section is melted by the high-temperature magma. Niobium and molybdenum are preferred materials for shell 23 because of their high melting points and relatively low densities.

The properties required for the thermal insulation sleeve 17 are: low thermal conductivity, high melting point, low density, and good structural strength. There are several materials fulfilling these requirements, e.g., $Al_2O_3$, $B_4C$, BeO, and MgO. BeO is the preferred material, because the preferred core for a Needle reactor comprises a homogeneous mixture of BeO and $UO_2$. Therefore, with a BeO insulating sleeve, thermal stresses at the sleeve-core interface are minimized. In addition, a BeO insulating sleeve performs the further function of reflecting neutrons back into the core, thereby increasing the efficiency of neutron utilization within the core.

There are several design alternatives for release mechanism 21, e.g., pressure-actuated release, timing mechanism, corrodible bolt, etc. The preferred design is the pressure-actuated release, since the release depth can be set most accurately with a mechanism of this type. This is because the pressure variation with depth in the earth's crust is accurately known (see FIGURE 3), whereas both the timing release mechanism and corrodible bolt would be subject to the vagaries of viscosity, chemical composition, and other less well-known variables in the crust. A suitable pressure-actuated switch for use in the release mechanism is described in U.S. Patent No. 2,783,320 to A. F. Fink. Other pressure-actuated release mechanisms will be apparent to those skilled in the telemetering art.

As mentioned previously, one of the objects of the invention is to obtain samples of the earth's crust from heretofore unattainable depths. A suitable magma sampling system comprises a series of refractory sampling bottles sealed with graduated rupture diaphragms. The rupture diaphragms are selected so that they will burst at predetermined depths, thereby allowing the ambient magma to flow into the sampling bottles. In this manner, a complete series of magma samples can be obtained from varying depths. Alternatively, the sampling bottles can be sealed with corrodible plugs of varying length. This method of sealing, however, is not as reliable as the pressure-dependent rupture diaphragm. The reasons for this are discussed above in connection with the design of the release mechanism 21.

Instrumentation for the Needle reactor falls into two classes: data transmitting systems, and data storing systems. Both these systems incorporate the same sensing elements, viz., pressure transducers, temperature probes, viscosity sensors, etc. The systems differ, however, in the treatment of the data after it has been obtained.

The data transmitting systems telemeter data to the earth's surface coninuously. One transmitting mechanism comprises a high-power, low-frequency radio transmitter. However, the engineering problems involved in constructing such a transmitter capable of sending a usuable signal through 100,000 feet of earth's crust are extremely complex. The preferred data transmission system comprises a sonic wave generator which sends coded signals by means of seismic waves through the earth's crust. Such generators have been built in connection with seismic prospecting studies, and the modification of existing designs for use with a Needle reactor is apparent to those skilled in the art.

The other major class of Needle reactor instrumentation is the data storage system. In this system, the data is stored after being gathered, and is "read out" when the Needle reactor is recovered at the earth's surface. The data storage system is exemplified by the instrumental packages placed aboard and recovered from high-altitude rockets. The high-temperature environment of the Needle reactor imposes severe limitations on the materials of both classes of data systems; however, these limitations are met through the use of solid state electronic components in conjunction with efficient thermal insulation.

Although several embodiments and examples of the invention have been described herein, these are intended to be merely illustrative, and various modifications can be made therein without departing from the spirit and scope of the invention as defined in the following claims.

What is claimed is:

1. In an apparatus for penetrating the earth's crust, the combination comprising,
    (a) a core capable of sustaining a nuclear chain reaction, the operating temperature of said core being substantially higher than the melting temperature of the highest-melting rock formation in the crustal region to be penetrated, and the total thermal energy available from said core being sufficient to melt a passage through said crustal region to the depth to be penetrated,
    (b) a high density ballast member affixed to said core, the weight of said ballast member being sufficient to raise the overall density of the core-ballast assembly to a value substantially greater than the density of the magma resulting from the melting of the rock by the thermal energy from said nuclear core,
    (c) and means for constraining the flow of thermal energy out of said core in the straight line path direction between said core and the center of the earth.

2. The apparatus according to claim 1, wherein said core-ballast assembly is substantially cylindrical in shape, the axial length of said cylinder being substantially greater than its diameter.

3. The apparatus according to claim 1, wherein said core is fueled with an oxide of a fissionable element.

4. The apparatus according to claim 3, wherein said fissionable element oxide is uranium dioxide ($UO_2$).

References Cited in the file of this patent

UNITED STATES PATENTS

| | | |
|---|---|---|
| 2,951,943 | Goodman | Sept. 6, 1960 |
| 2,952,019 | Goodman | Sept. 6, 1960 |